United States Patent
Okada et al.

(10) Patent No.: US 6,550,352 B2
(45) Date of Patent: Apr. 22, 2003

(54) DEVICE AND METHOD FOR AUTOMATIC TRANSMISSION CONTROL

(75) Inventors: Takashi Okada, Hitachi (JP); Toshimichi Minowa, Mito (JP); Mitsuo Kayano, Hitachi (JP); Tatsuya Ochi, Hitachi (JP); Hiroshi Sakamoto, Hitachi (JP); Hiroshi Kuroiwa, Hitachi (JP); Naoyuki Ozaki, Hitachinaka (JP); Tetsuo Matsumura, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/799,800

(22) Filed: Mar. 7, 2001

(65) Prior Publication Data

US 2002/0073792 A1 Jun. 20, 2002

(30) Foreign Application Priority Data

Nov. 29, 2000 (JP) ......................... 2000-367742

(51) Int. Cl.⁷ ..................... F16H 59/00; F16H 61/00
(52) U.S. Cl. ................................ 74/335; 74/333
(58) Field of Search ..................... 74/333, 335, 336, 74/339

(56) References Cited

U.S. PATENT DOCUMENTS

| | | | | |
|---|---|---|---|---|
| 4,627,312 A | * | 12/1986 | Fujieda et al. | 477/124 |
| 4,823,639 A | * | 4/1989 | Krause et al. | 74/331 |
| 5,097,726 A | * | 3/1992 | Asada | 475/153 |
| 5,113,720 A | * | 5/1992 | Asayama et al. | 477/154 |
| 5,123,293 A | * | 6/1992 | Umemoto et al. | 180/247 |
| 5,429,005 A | * | 7/1995 | Fukui et al. | 74/325 |
| 5,475,595 A | * | 12/1995 | Asahara et al. | 192/103 C |
| 5,599,247 A | * | 2/1997 | Matsufuji | 475/128 |
| 5,651,288 A | * | 7/1997 | Meeusen | 192/85 AA |
| 5,944,630 A | * | 8/1999 | Omote | 477/5 |
| 6,073,507 A | * | 6/2000 | Ota et al. | 477/906 |
| 6,196,077 B1 | * | 3/2001 | Lee | 74/335 |
| 6,276,224 B1 | * | 8/2001 | Ueda et al. | 74/335 |
| 6,286,379 B1 | * | 9/2001 | Yester et al. | 475/204 |
| 6,295,884 B1 | * | 10/2001 | Miyake et al. | 477/121 |

* cited by examiner

Primary Examiner—Christopher P. Schwartz
Assistant Examiner—Devon Kramer
(74) Attorney, Agent, or Firm—Crowell & Moring LLP

(57) ABSTRACT

The deterioration of comfort is prevented by suppressing the shifting of a timing for releasing a claw clutch due to a change in the characteristic of a friction clutch or the like at the time of torque transmission switching from the claw clutch to the friction clutch during speed changing. A start timing for releasing the claw clutch is learned by determining a state of the released claw clutch. Even when a characteristic change occurs because of a change with time, such as the response delay of an assist clutch or the like, each optimal releasing control timing is learned.

9 Claims, 11 Drawing Sheets

DEVICE AND METHOD FOR AUTOMATIC TRANSMISSION CONTROL

BACKGROUND OF THE INVENTION

The present invention relates to a control method and a control device for an automatic transmission control system in an automobile.

The automobile of a manual transmission has excellent fuel economy compared with one having a transmission based on a torque converter. Recently, an automatic manual transmission (automatic MT) has been developed, which is designed to perform automatic clutch or gear changing by using the mechanism of the manual transmission. However, during the control of speed changing in the conventional automatic MT, fluctuation occurred in acceleration because of the releasing/connecting of a first friction clutch provided to disconnect/connect torque transmission between an engine and the transmission, giving an unnatural feeling to an occupant. This problem led to the disclosure of an automatic transmission, which includes a second friction clutch (assist clutch) provided between the input and output shafts of the transmission to carry out torque transmission during the speed changing of the conventional automatic MT, as described in Japanese Patent Application Laid-open No. 65199/2000. In the control of speed changing by the automatic Mt having such an assist clutch, the assist clutch is pressed to carry out torque transmission from the connected state of a claw clutch at the starting time of the speed changing while the assist clutch is slid. The claw clutch is released after the completion of predetermined torque transmission. As exemplified by the system just noted above, torque transmission is realized during speed changing by switching to the assist clutch from the claw clutch at the starting time of the speed changing.

However, the claw clutch allows only ON-OFF operations to be performed for setting connected and disconnected states. Hence, if the claw clutch is released while torque transmission by the assist clutch is insufficient or excessive, large torque fluctuation occurs during the releasing of the claw clutch, resulting in the deterioration of comfortableness. This problem necessitates the accurate setting of a timing for switching between the claw clutch and the assist clutch. With regard to the torque transmission characteristic of the assist clutch, however, a constant friction state is not provided. To explain, friction state variance occurs because of the change of a friction material with time, the change of an oil characteristic in the case of a wet clutch, a temperature characteristic, and so on. Under these circumstances, a change is inevitable in the switching timing, and comfortableness is deteriorated depending on the state.

SUMMARY OF THE INVENTION

Therefore, an object of the present invention is to provide a learning method, and another object of the present invention is to provide a learning device for an automatic transmission control system which is designed to optimize a timing for switching between an assist clutch and a claw clutch during speed changing and which is capable of preventing the deterioration of comfortableness due to a change with time and so on by optimizing each timing for switching between the claw clutch and the assist clutch.

In order to achieve one of the above objects, according to the invention, there is provided a control method comprising the steps of: pressing an assist clutch while a claw clutch is connected base on a speed changing command; performing torque transmission by the assist clutch; and then releasing the claw clutch by a predetermined timing. In this case, a releasing timing is corrected by making determination as to whether the timing for releasing the claw clutch has been fastor slow according to the rotational speed of an output shaft after the releasing of the claw clutch.

In order to achieve the other of the foregoing objects, according to the invention, there is provided a control device for pressing an assist clutch while a claw clutch is connected based on a speed changing command, performing torque transmission by the assist clutch, and then releasing the claw clutch by a predetermined timing. In this case, the control device comprises learning control means for measuring the rotational speed of the output shaft of a transmission, determining whether a timing for releasing the claw clutch has been fast or slow, and then correcting the releasing timing according to the results of the determination.

The foregoing constitution enables determination to be made as to whether the timing for releasing the claw clutch has been fast or slow according to a change in the rotational speed of the output shaft of the transmission, and the releasing timing to be corrected accordingly. Since the occurrence of torque fluctuation during switching between the assist clutch and the claw clutch can be detected, and each releasing timing of the claw clutch can be corrected based on the results of the detection, it is possible to prevent the great deterioration of comfortableness.

Furthermore, in order to achieve the foregoing object, according to the invention, the releasing timing is corrected by making determination as to whether the timing for releasing the claw clutch has been fast or slow according to the torque of the output shaft after the releasing of the claw clutch.

Also, in order to achieve the foregoing object, according to the invention, learning control means is provided for measuring the torque of the output shaft of the transmission, determining whether the timing for releasing the claw clutch has been fast or slow, and correcting the releasing timing based on the results of the determination.

Still further, in order to achieve the foregoing object, according to the invention, determination is made as to whether the timing for releasing the claw clutch has been fast or slow according to the acceleration of a vehicle after the releasing of the claw clutch, and then the releasing timing is corrected.

Also, in order to achieve the foregoing object, according to the invention, learning control means is provided for measuring the acceleration of the vehicle, determining whether the timing for releasing the claw clutch has been fast or slow, and correcting the releasing timing based on the results of the determination.

The foregoing constitution enables determination to be made as to whether the timing for releasing the claw clutch has been fast or slow according to a change in the torque of the output shaft of the transmission, a change in the acceleration of the vehicle, and so on, and the releasing timing to be corrected accordingly. Since the occurrence of torque fluctuation during switching between the assist clutch and the claw clutch can be detected, and each releasing timing of the claw clutch can be corrected based on the results of the detection, it is possible to prevent the great deterioration of comfortableness.

DESCRIPTION OF THE PREFERRED EMBODIMENTS

Next, description will be made of preferred embodiments of the present invention with reference to the accompanying drawings.

Figure 1:
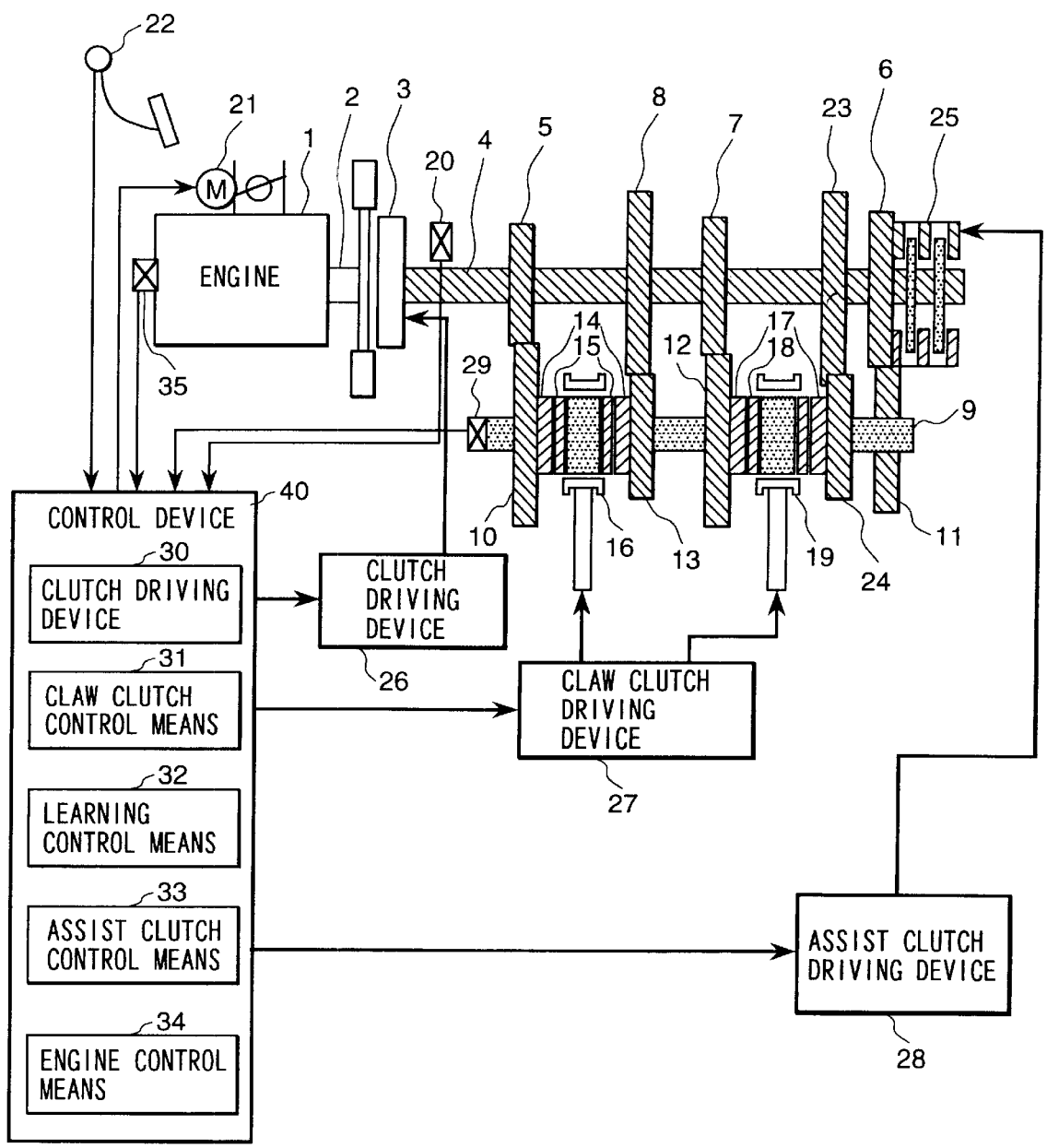
FIG. 1 is a constitutional view of an entire automatic transmission according to an embodiment of the present invention.

FIG. 1 is a constitutional view showing a learning device for an automatic transmission control system according to an embodiment of the invention.

An engine 1 includes an engine speed sensors 35 for measuring the rotational speed of the engine 1, and an electronic control throttle 21 for adjusting engine torque. An aperture of the electronic control throttle 21 is set by pressing an accelerator pedal. The amount of pressing the accelerator pedal is outputted from an accelerator pedal sensor provided therein, and then captured as a throttle aperture command value in a control device 40. The electronic control throttle 21 enables the torque of the engine 1 to be controlled highly accurately. This electronic control throttle 21 is provided in an intake pipe (not shown). The throttle aperture of the electronic control throttle 21 is entered as a throttle aperture signal therefrom to the control device 40. In the engine 1, the amount of intake air is controlled by the electronic control throttle 21, and the amount of fuel matching the amount of intake air is injected from a fuel injector (not shown). In addition, in the engine 1, an air-fuel ratio is determined based on the amounts of air and fuel, an ignition time is determined based on a signal regarding an speed or the like, and ignition is provided by an ignition device (not shown). Regarding the fuel injector, one may be selected from an intake port injection system for injecting fuel to an intake port, and an in-cylinder injection system for directly injecting fuel into a cylinder. Based on comparison regarding a running region (region determined by engine torque or an engine speed) between engines, however, it is advantageous to use an engine capable of reducing fuel costs, and having high exhaust performance.

The engine output shaft 2 of the engine 1 includes a clutch 3 provided to enable the torque of the engine 1 to be transmitted to an input shaft 4. This clutch 3 has a clutch mechanism for transmitting the engine torque to the transmission. One example of such is a starting/speed changing clutch used when connection is made at the time of starting an automobile. In this case, for the clutch 3, a dry single plate system or the like is used. First to fourth driving gears (fifth to first speed driving gears) 5, 8, 7 and 23 are secured to the input shaft 4. This input shaft 4 also includes a driving gear 6 rotatably provided for an assist clutch.

For the control of the pressing force (clutch torque) of the clutch 3, one may be selected for use from an actuator (not shown) driven by hydraulic pressure, an actuator driven by an by an electric motor or the like, andsoon. Such an actuator is controlled by clutch control means 30 housed in the control device 40. By adjusting the pressing force (clutch torque) of the clutch 3, power transmission or the like can be carried out from the engine output shaft 2 of the engine 1 to the input shaft 4 in a disconnected/connected or in a slid state. To detect the rotational speed of the input shaft 4, a sensor 20 is provided in the vicinity thereof.

On the other hand, the driving wheel output shaft 9 of the transmission includes first to fourth driven gears (fifth, second, fourth and first driven gears) 10, 13, 12 and 24, the first and second having synchronizer rings 14, and the fourth and first having synchronizer rings 17, which are all provided so as to be rotated. In addition, the driving wheel output shaft 9 includes a driven gear 11 secured thereto for the assist clutch.

The first driven gear 10 is engaged with the first driving gear 5; the second driven gear 13 with the second driving gear 8; the third driven gear 12 with the third driving gear 7; and the fourth driven gear 24 with the fourth driving gear 23. Also, the driven gear 11 for the assist clutch is engaged with the driving gear 6 for the assist clutch.

Between the first driven gear 10 and the second driving gear 13, a first claw clutch 16 is provided, which has a synchronizer engaging mechanism 15 for selecting the first or the second driven gear 10 or 13 and engaging it with the driving wheel output shaft 9. Each of the first and second driven gears 10 and 13 has a stopper (not shown) provided to prevent the axial movement of the driving wheel output shaft 9. The first claw clutch 16 has a plurality of grooves (not shown) to be engaged with a plurality of grooves (not shown) provided in the driving wheel output shaft 9. This claw clutch 16 is allowed to move in the axial direction of the driving wheel output shaft 9, but limited for its movement in the rotational direction thereof. Accordingly, rotational torque sent from the first or second driving gear 5 or 8 to the first or second driven gear 10 or 13 is transmitted to the first claw clutch 16, and then transmitted from the first claw clutch 16 to the driving wheel output shaft 9.

Between the third and fourth driven gears 12 and 24, a second claw clutch 19 is provided, which has a synchronizer engaging gear 18 for selecting the third or fourth driven gear 12 or 24 and engaging it with the driving wheel output shaft 9. Each of the third and fourth driven gears 12 and 24 has a stopper (not shown) for preventing the axial movement of the driving wheel output shaft 9. As in the case of the first claw clutch 16, the second claw clutch 19 has a plurality of grooves (not shown) to be engaged with a plurality of grooves (not shown) provided in the driving wheel output shaft 9. The second claw clutch 19 is allowed to moved in the axial direction of the driving wheel output shaft 9, but limited for its movement in the rotational direction thereof.

Accordingly, rotational torque sent from the third or fourth driving gears 7 or 23 to the third or fourth driven gears 12 or 24 is transmitted to the second claw clutch 19, and then transmitted from the second claw clutch 19 to the driving wheel output shaft 9.

The input shaft 4 also includes an assist clutch (friction clutch) 25 for engaging the assist clutch driving gear 6 rotatably provided in the input shaft 4 with the same. This assist clutch driving gear 6 has a stopper (not shown) provided to prevent the axial movement of the input shaft 4. The assist clutch 25 transmits power by a friction force generated by pressing a clutch plate provided in the input shaft 4 and a clutch plate provided in the assist clutch 25. Accordingly, rotational torque sent from the input shaft 4 through the assist clutch driving gear 6 is transmitted through the assist clutch driven gear 11 to the driving wheel output shaft 9. Therefore, to transmit the rotational torque of the input shaft 4 to the assist clutch driving gear 6, torque must be transmitted by driving the assist clutch 25, and sliding or connecting the assist clutch driving gear 6 and the input shaft 4. The driving of the assist clutch 25 is carried out by the actuator driven by hydraulic pressure, the electric actuator such as an electric motor or the like. In the case of the actuator driven by hydraulic pressure, the connecting force of the assist clutch 25 can be adjusted by controlling the hydraulic pressure and, by torque transmission while the assist clutch 25 is in a slid state, the rotational torque of the input shaft 4 can be transmitted through the assist clutch driving gear 6 and the assist clutch driven gear 11 to the driving wheel output shaft 9.

To transmit the rotational torque of the input shaft 4 to the first claw clutch 16, the first claw clutch 16 must be moved in the axial direction of the driving wheel output shaft 9, and connected to the first or the second driven gear 10 or 13. To connect the first or second driven gear 10 or 13 to the driving wheel output shaft 9, the first claw clutch 16 is moved. For such a movement of the first claw clutch 16, one may be selected for use from the actuator driven by hydraulic pressure, the electric actuator such as an electric motor or the like, and so on. By adjusting the stroke moving amount of the first claw clutch 16, the rotational torque of the input shaft 4 can be transmitted through the first claw clutch 16 to the driving wheel output shaft 9. In addition, the rotational speed of the driving wheel output shaft 9 is detected by a sensor 29 provided in the vicinity thereof.

Further, to transmit the rotational torque of the input shaft 4 to the second claw clutch 19, the second claw clutch 19 must be moved in the axial direction of the driving wheel output shaft 9, and connected to the third or fourth driven gear 12 or 24. To connect the third or fourth driven gear 12 or 24 to the driving wheel output shaft 9, the second claw clutch 19 is moved. For such a movement of the second claw clutch 19, one may be selected for use from the actuator driven by hydraulic pressure, the electric actuator such as an electric motor or the like, and so on. By adjusting the stroke moving amount of the second claw clutch 19, the rotational torque of the input shaft 4 can be transmitted through the second claw clutch 19 to the driving wheel output shaft 9.

The control of the actuator driving of the first and second claw clutches 16 and 19 is carried out by a first and second claw clutch driving device 27 based on a command from claw clutch control means 31 housed in the driving device 40. The control of the actuator driving of the assist clutch 25 is carried out by an assist clutch driving device 28 based on a command from assist clutch control means 33 housed in the control device 40.

The rotational torque of the input shaft 4 that has thus been transmitted from the first, second, third and fourth driving gears 5, 8, 7 and 23 through the first, second, third and fourth driven gears 10, 13, 12 and 24 to the driving wheel output shaft 9 is then transmitted through a not-shown differential gear to an axle to rotate a not-shown driving wheel.

The actuator for driving the clutch 3 controls a stroke or a pressing force by a clutch driving device 26. The actuators for driving the first and second claw clutches 16 and 19 control strokes or forces by the claw clutch driving device 27. The actuator for driving the assist clutch 25 presses the clutch plate of the assist clutch 25 to control clutch transmission torque by the assist clutch driving device 28 based on a control command from the assist clutch control means 33. In addition, the electronic control throttle 21 controls a throttle aperture by engine control means 34.

Further, based on a command from the claw clutch control means 31, the first and second claw clutches 16 and 19 are driven by the claw clutch driving device 27. In this case, timings for starting the operations of the first and second claw clutches 16 and 19 must be set optimal. Learning control means 32 is provided to automatically set such a control timing to be optimal. The learning control means 32 will be described in detail later.

Figure 2:
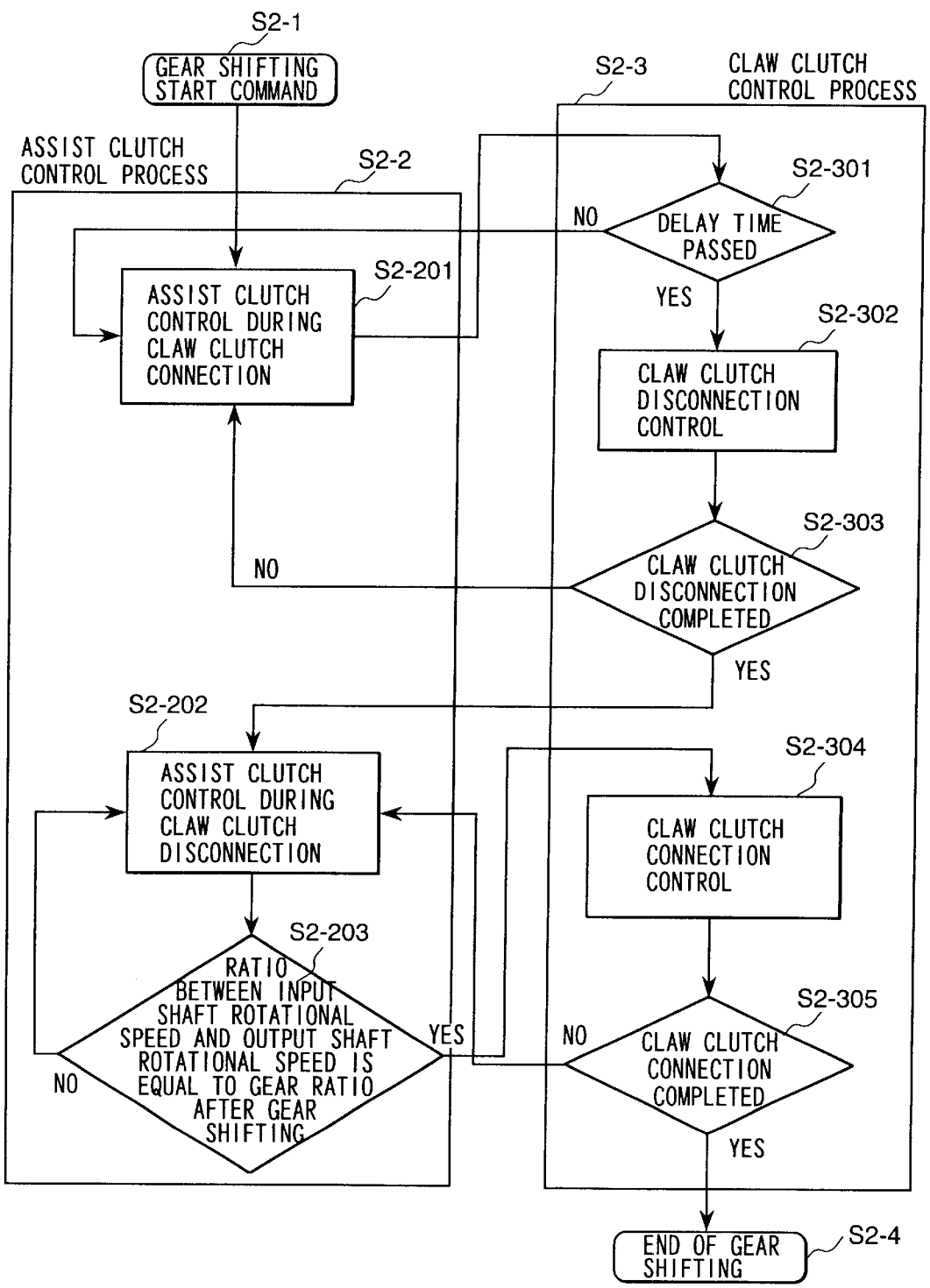
FIG. 2 is a flowchart showing a process carried out by claw clutch control means and assist clutch control means during speed changing of the automatic transmission shown in FIG. 1.
Figure 3:
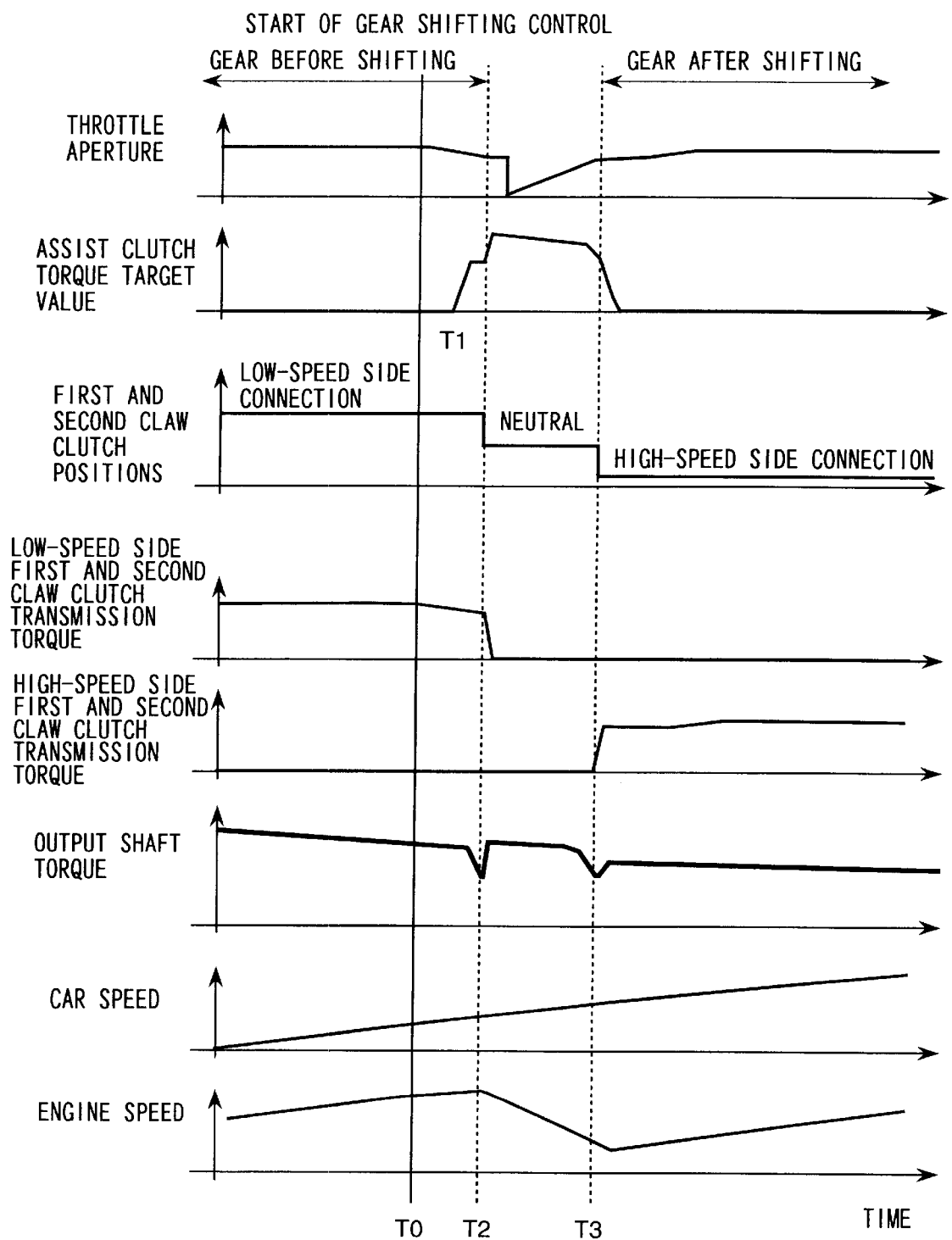
FIG. 3 is a time chart showing a shifting-up operation of the automatic transmission shown in FIG. 2.

Next, description will be made of speed changing control when the assist clutch 25 is used by referring to FIGS. 2 and 3. FIG. 2 is a flowchart illustrating the control and operations of the first and second claw clutches, and the control and operation of the assist clutch 25 during speed changing. FIG. 3 is a time chart showing torque for driving the electronic control throttle 21, the assist clutch 25, the first and second claw clutches 16 and 19 and the output shaft, and the rotational speed of the engine 1 when each control of the flowchart of FIG. 2 is executed.

As shown in FIG. 2, when a speed changing command S2-1 is generated during traveling, the assist clutch control means 33 performs the process of controlling the assist clutch driving device 28 for driving the assist clutch 25. The process of controlling performed by this assist clutch control means is S2-2. In the assist clutch control process S2-2, first, since either one of the first or second claw clutch 16 or 19 is always in a connected state, an assist clutch control command in the connected state is calculated, control is executed (S2-2-1), and then the process moves to the process of controlling the claw clutch (S2-3). The process of controlling the claw clutch is carried out by the claw clutch control means 31 for outputting a command to the claw clutch driving device 27 for driving the claw clutches 16 and 19. In the claw clutch control process S2-3, first, determination is made as to the passage of time equivalent to the response delay time of the assist clutches 6 and 25 from the time passed from the control start of the assist clutch control S2-201 (S2-301). In this case, if the passage of time has not reached the response delay time, the assist clutch control in the claw clutch connected state is executed again in the assist clutch control process S2-1, and similar determination is made as to the passage of time equivalent to the response delay time (S2-30). If the passage of time has reached the response delay time, then the releasing control of the claw clutch is executed in the claw clutch control process (S2-302). Subsequently, determination is made as to the completion of claw clutch releasing (S2-303). If the completion is not determined, the assist clutch control S2-201 in the claw clutch connected state is executed again. The foregoing operation is repeated and, when the completion of the claw clutch releasing is determined in the claw clutch releasing completion determination S3-303 of the claw clutch control process S2-3, the assist clutch control S2-202 in the claw clutch release state of the assist clutch control process S2-2 is executed. Upon the execution of the control S2-202 in the claw clutch release state, determination is made as to the equality of a rotational speed ratio between the input and output shafts 4 and 9 of the transmission to a gear ratio after speed changing, alternatively as to whether a difference there between is within a predetermined value or not (S2-203). Here, if the equality of the rotational speed ratio to the gear ratio after the speed changing or the existence of the difference within the predetermined value is not determined, then the assist clutch control S2-202 in the claw clutch release state is executed again. Then, determination is made again as to the equality of the rotational speed ratio to the gear ratio after the speed changing, alternatively as to the existence of the difference within the predetermined value (S2-203). If the equality of the rotational speed ratio to the gear ratio after the speed changing or the existence of the difference within the predetermined value is determined, the claw clutch connection control (S2-304) of the claw clutch control process S2-3 is executed. Subsequently, determination is made as to the connection of the claw clutch (S2-305). If the connection is not determined, then the assist clutch control S2-202 in the claw clutch release state is executed again, and similar determination is made as to a rotational speed ratio (S2-203). Then, the claw clutch connection control S2-304 is executed, and determination is made as to the connection of the claw clutch (S2-305). Here, if the connection of the claw clutch is determined, then the end of the speed changing is determined, and the speed changing control process is completed (S2-4).

The speed changing control using the assist clutch 25 has just been described.

Now, description will be made of changes in torque for driving the electronic control throttle 21, the assist clutch 25, the first and second claw clutches 16 and 19 and the output shaft 9 and in the rotational speed of the engine 1 during shifting-up in the foregoing case by referring to the time chart of FIG. 3. In FIG. 3, control is executed for reducing a throttle aperture at the starting time of speed changing, and increasing the throttle aperture after the end of the speed changing, thereby making smooth a torque change during the speed changing. There may be a case where no such control for reducing/increasing the throttle aperture before the start of speed changing/after the end of speed changing is not executed.

FIG. 3 shows, from above, a throttle aperture, the target transmission torque of the assist clutches 6 and 25, the selected states (positions) of the claw clutches 16 and 19, the low-speed side transmission torque of the claw clutches 16 and 19, the high-speed side transmission torque of the claw clutches 16 and 19, torque transmitted to the transmission output shaft 9, a car speed, and an engine speed. When speed changing is started, the target transmission torque of the assist clutch 25 is calculated, and assist clutch transmission torque is generated by the assist clutch driving device 28. Here, a condition for releasing the claw clutches 16 and 19 is the generation of predetermined assist clutch torque according to engine torque. At this time, since the transmission torque of the assist clutch 25 cannot be calculated, the response characteristic of the transmission torque of the assist clutch 25 is obtained beforehand, and the releasing control of the claw clutches 16 and 19 is executed after the passage of response delay time predicted from the results thereof. In the described case, the command of the assist clutch 25 is started at time T1. Then, after the passage of specified time, at time T2, the releasing control is executed for the claw clutches 16 and 19, and the claw clutches are set in neutral states. After the releasing of the claw clutches 16 and 19 at the time T2, the assist clutch 25 calculates target transmission torque while the claw clutches 16 and 19 are in the released states, and executes control. Here, since the claw clutches 16 and 19 are released at the time T2 during the shifting-up, low-speed side transmission torque becomes 0. Similarly, high-speed side transmission torque is 0. However, because of the realization of transmission torque by the assist clutch 25, torque has been transmitted to the output shaft 9. If the claw clutches 16 and 19 are in the released states, the torque transmission by the assist clutch 25 places a load on the engine side, reducing an engine speed. In this case, the engine speed is equal to the rotational speed of the input shaft 4 of the transmission. When the engine speed is reduced, and a ratio between the engine speed (rotational speed of the input shaft) and the rotational speed of the output shaft becomes equal to a gear ratio after speed changing, alternatively if a difference therebetween is set within a predetermined value, then the claw clutches 16 and 19 can be connected. Accordingly, the claw clutches 16 and 19 are operated, and a high-speed gear is connected. After the connection of the high-speed gear, the assist gear 25 executes releasing by setting target transmission torque at 0. In this way, the speed changing is completed, realizing the torque transmission of the output shaft during the speed changing.

Figure 4:
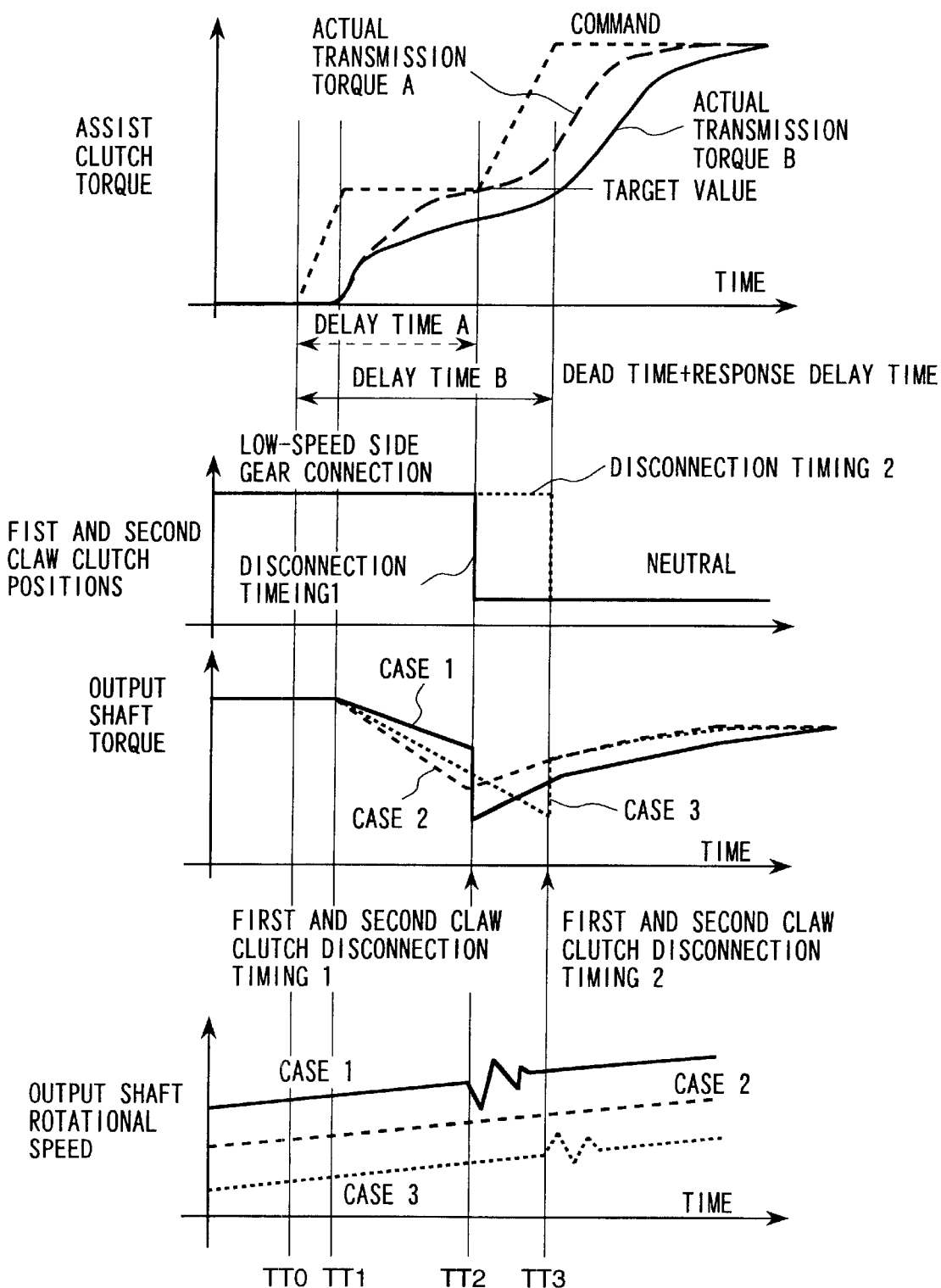
FIG. 4 is a time chart showing states of an assist clutch, a claw clutch and an output shaft rotational speed at the starting time of speed changing of the automatic transmission shown in FIG. 3.

With regard to torque transmission from the engine to the output shaft 9, at the starting time of the speed changing, torque transmission through the claw clutches 16 and 19, and torque transmission through the assist clutch 25 are simultaneously carried out. FIG. 4 shows the state of torque transmission and the state of the rotational speed of the output shaft in the above case.

FIG. 4 shows, from above, the transmission torque command value of the assist clutch 25, actual transmission torque, the positions (low-speed side connected state, and neutral state) of the first and second claw clutches, output shaft torque applied to the output shaft 9, and lastly the rotational speed of the output shaft 9, at the time of starting speed changing.

When a speed changing start command is generated, a control command is outputted from the assist clutch control means 33, and the assist clutch driving device 28 drives the assist clutch 25. In FIG. 4, a command is outputted from the assist clutch control means 33 at time TT0. At this time, because of the presence of response delay time in the response of the assist clutch driving device 28 or the assist clutch 25, the generation of transmission torque is started at time TT1 delayed from the time TT0. To release the first and second claw clutches 16 and 19, transmission torque by the assist clutch 25 must be set equal to a predetermined value. The torque of the engine 1 is transmitted through the clutch 3 to the input shaft 4, and the torque of the input shaft 4 is transmitted from the gear, the first and second claw clutches having been connected thereto, through the claw clutches to the output shaft 9. Consequently, the torque from the input shaft 4 is applied to the connected first and second claw clutches 16 and 19, making it impossible to release the claw clutches by a small driving force. Thus, by pressing the assist clutch 25 to transmit torque from the input shaft 4 to the output shaft 9, the transmission torque applied to the connected first and second claw clutches 16 and 19 is reduced, and the connected first and second claw clutches 16 and 19 are released. In addition, because of the torque transmission of the engine 1 through the claw clutches 16 and 19 to the output shaft 9, if no torque transmission has been completed to the output shaft 9 by the assist clutch 25, output shaft torque is changed at the point of time of releasing the claw clutches 16 and 19, generating a speed changing shock. Thus, as shown in the uppermost part of FIG. 4, the assist clutch control means 33 outputs a target torque command for enabling the first and second claw clutches 16 and 19 to be released. Regarding the transmission torque by the assist clutch 25, because of the presence of the response delay as noted above, even if a command is issued at the time TT0, transmission torque is generated at the time TT1 delayed from the time TT0. In this case, as shown in the uppermost part of FIG. 4, for the response of actual transmission torque, a response waveform is changed depending on the state of the assist clutch driving device 28 or the friction state of the assist clutch 25 as exemplified by a line A or B. In particular, a change with time made by a long-time frequent use of the clutch causes a characteristic change. In FIG. 4, actual transmission torque A rises relatively fast with respect to the same command, and reaches target torque at time TT2 (delay time A). On the other hand, actual transmission torque B responds later than A, and reaches target torque at time TT3 (delay time B). Here, first, considering the case of the actual transmission torque A, the target torque is realized at the time TT2 if a response is similar to the transmission torque A. Accordingly, the first and second claw clutches 16 and 19 should preferably be released at this time. That is, as shown in the positions of the first and second claw clutches 16 and 19, second from above in FIG. 4, the first and second claw clutches 16 and 19 are released at a releasing timing 1. Output shaft torque in this case becomes one similar to that of a case 2 shown in the output shaft torque, third from above in FIG. 4. Thus, smooth output shaft torque is realized by releasing the first and second claw clutches 16 and 19 at such a proper timing. The rotational speed of the output shaft 9 in this case takes a waveform similar to that of case 2 shown in the output rotational speed, lowest in FIG. 4.

Next, description will be made of a case where the transmission torque of the assist clutch 25 becomes one equal to the transmission torque B of FIG. 4, in other words, the releasing timing of the first and second claw clutches 16 and 19 is set equal to the transmission torque A (releasing timing of FIG. 4). In this case, the first and second claw clutches 16 and 19 are released while the transmission torque of the assist clutch 25 has not reached the target torque as in the case of the transmission torque B of FIG. 4. That is, torque transmission by the assist clutch 25 is insufficient and, if the first and second claw clutches 16 and 19 are released in this state, then a torque level difference is generated as in the case 1 of the output shaft torque of FIG. 4. Consequently, at the time of starting the speed changing, a diver feels a speed changing shock, deteriorating comfortableness. The rotational speed of the output shaft 9 in this case shows a vibrating waveform as shown in the case 1 of the output shaft rotational speed of FIG. 4. Therefore, when a response similar to the transmission torque B is shown, the first and second claw clutches should preferably be executed at a releasing time, e.g., a releasing timing 2 shown in the first and second claw clutch positions of FIG. 4.

Now, description will be made of an opposite case where if a response is similar to the transmission torque A, the first and second claw clutches 16 and 19 are released at the releasing timing 2. In this case, since torque equal to target torque or higher is generated by the assist clutch 25 as in the case of the transmission torque B, when releasing is carried out at the releasing timing 2, a speed changing shock occurs in output shaft torque, e.g., torque pushing-up which occurs in the case 3 of output shaft torque shown in FIG. 4. For the rotational speed of the output shaft 9 at this time, as in the case 3 of the output shaft rotational speed shown in the lowest part of FIG. 4, vibration occurs at the time of releasing the first and second claw clutches 16 and 19.

As apparent from the foregoing, it is necessary to match the releasing timings of the first and second claw clutches 16 and 19 according to the rising of the assist clutch 25. If the timings are not matched, a speed changing shock occurs during switching between the clutches at the start of speed changing, giving an unnatural feeling to the driver and deteriorating comfortableness. Further, it is necessary to change each timing of switching from the claw clutches 16 and 19 to the assist clutch 25 in corresponding relation to a characteristic change caused by the change with time of the assist clutch 25. To achieve such tasks, according to the invention, the claw clutch control means 31 and the learning control means 32 similar to those shown in FIGS. 5 and 6 are provided.

Next, description will be made of the claw clutch control means 31 by referring to FIG. 5.

Figure 5:
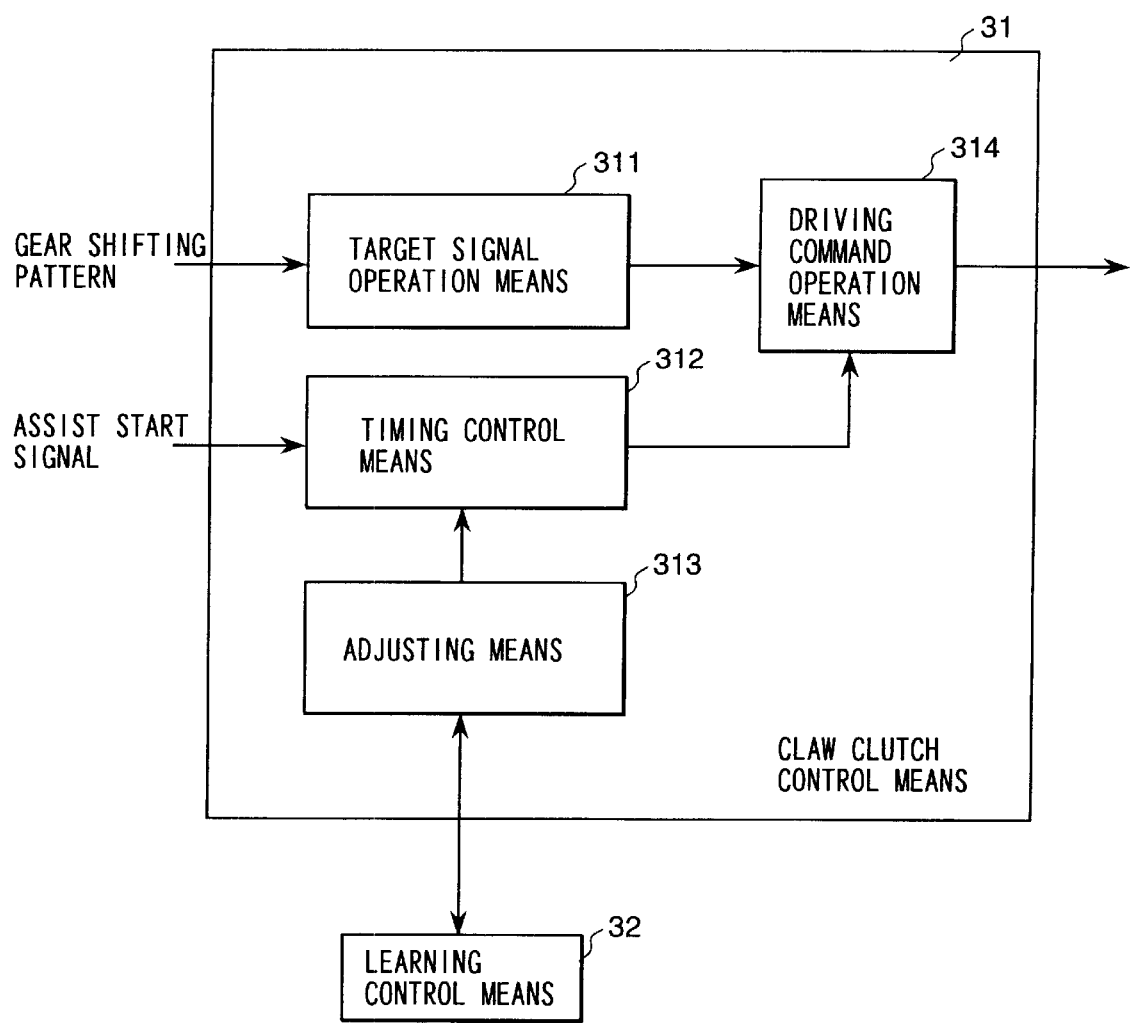
FIG. 5 is a constitutional view of claw clutch control means shown in FIG. 1.
Figure 6:
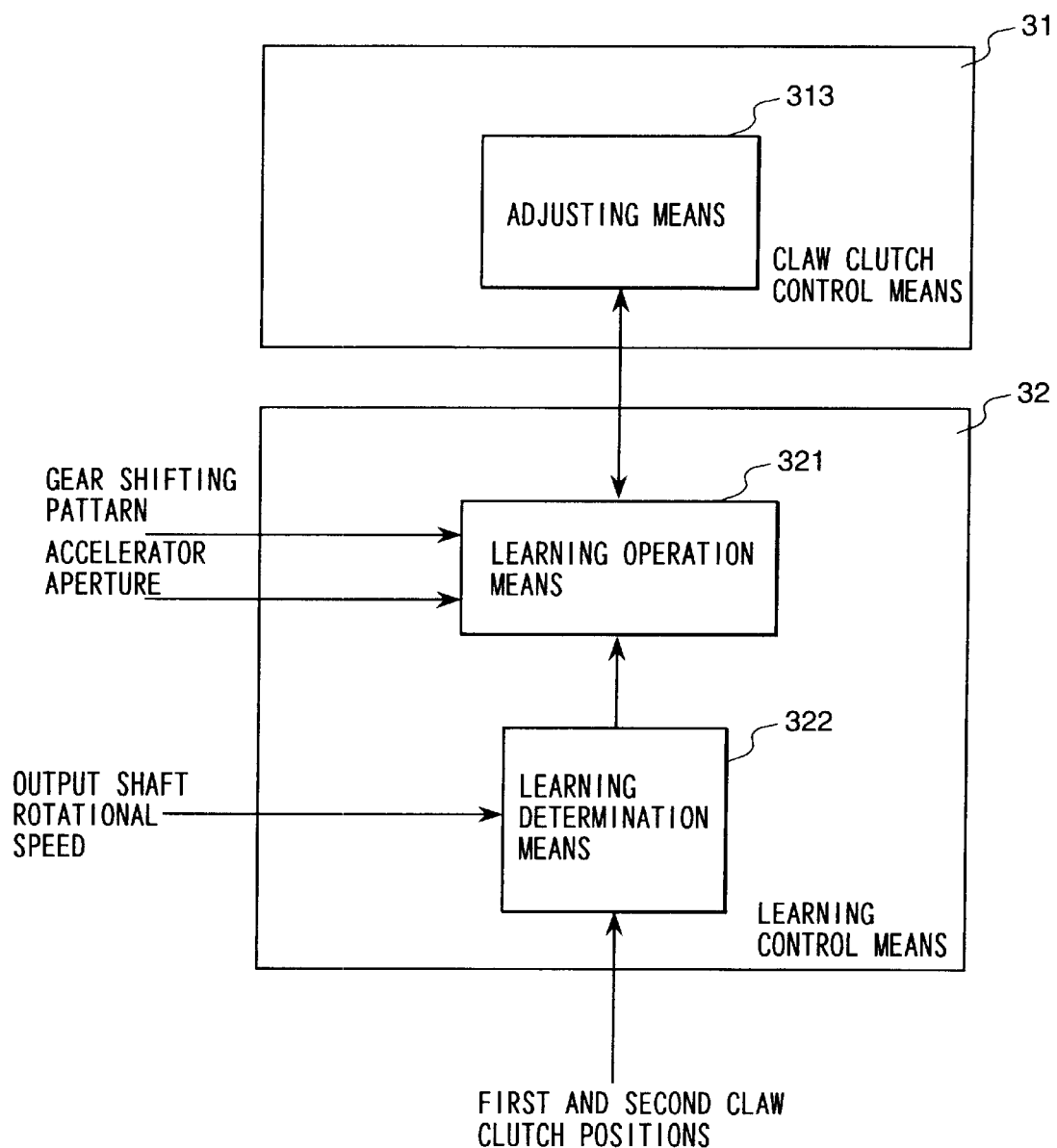
FIG. 6 is a constitutional view of learning control means shown in FIG. 1.

The claw clutch control means 31 shown in FIG. 5 captures a gear shifting pattern during speed changing control, a signal regarding the control start of the assist clutch control means 33 and a signal from the learning control means 32, and calculates control command signals to be sent to the first and second claw clutch driving devices for driving the first and second claw clutches 16 and 19. Here, the gear shifting pattern is a signal for identifying a speed changing operation from a first to second gear speed, from a second to third gear speed or the like. For example, such a speed changing operation can be identified by setting a speed change from a first to second gear speed as a gear shifting pattern 1, from a second to third gear speed as a gear shifting pattern 6, and so on.

As shown in FIG. 5, the claw clutch control means 31 includes target signal operation means 311 for calculating target signals for driving the first and second claw clutches 16 and 19 according to the gear shifting pattern, timing control means 312 for capturing the driving start timing of the assist clutch 25 outputted from the assist clutch control means 33 and controlling the driving timings of the claw clutches 16 and 19, adjusting means 313 for adjusting assist clutch delay time necessary for the determination of a control timing by the timing control means 312, and driving command operation means 314 for calculating a control signal for driving the claw clutch driving device 27.

The target signal operation means 311 shown in FIG. 5 sets target values for the operations of the first and second claw clutches 16 and 19 according to the gear shifting pattern. Now, the example of shifting up from the first to the second gear speed is taken. In the speed changing from the first to the second, first, since the vehicle is traveling in the first gear speed connected state, the first-speed driven gear 24 of the output shaft 9 shown in FIG. 1 has been connected to the output shaft 9 by the second claw clutch 19. Then, a speed changing operation is started and, to change a speed to the second, the second claw clutch 19 is released from the first-speed driven gear 24. Accordingly, the first and second claw clutches 16 and 19 are removed from all the driven gears, generating a neutral state. Then, to change to the second speed, the second-speed driven gear 14 is connected to the output shaft 9 by connecting the first claw clutch 16 for connecting the second-speed driven gear 13 to the second speed side. Thus, the target values for the respective operations of the first and second claw clutches vary according to the gear shifting patterns, and the setting of target signals for driving the respective claw clutches 16 and 19 is carried out by the target signal operation means 311.

Next, description will be made of the timing control means 312 shown in FIG. 5. As noted above, proper timings are set for releasing the first and second claw clutches 16 and 19 according to the response of the assist clutch 25. Such setting is necessary for suppressing a speed changing shock generated at the start of speed changing. Thus, the timing control means 312 captures a control signal for driving the assist clutch 25, and then sets timings for starting the driving of the first and second claw clutches 16 and 19. For example, after the output of a control signal for driving the assist clutch 25 from the assist clutch control means 33, timings are controlled such that commands for driving the first and second claw clutches 16 and 19 from the claw clutch control means 31 after the response delay time of the assist clutch 25 from the start time thereof. In FIG. 5, the driving command operation means 314 calculates a driving signal for achieving a target value calculated by the target signal operation means 311, and a timing for actually outputting this driving signal is controlled by the timing control means 312. Thus, it is possible to optionally set timings for driving the first and second claw clutches 16 and 17 by the timing control means 312.

Here, the control start timings of the first and second claw clutches 16 and 17 are set by the adjusting means 313. Response delay time set by the adjusting means 313 is each learned by the learning control means 32. Accordingly, even when a change occurs in delay time because of a change with time, optimal delay time can always be set, and a control timing can be optimized. In this case, the response delay of the assist clutch 25 also varies depending on target transmission torque. For example, delay time is small when target transmission torque is large, delay time is large when target transmission torque is small, and other cases may be conceivable. Thus, at the adjusting means 313, a delay time table may be prepared or a mathematical expression model may be built according to target transmission torque, an accelerator aperture for determining the target transmission torque, and a gear shifting pattern. In this way, a control timing can be accurately controlled for any gear shifting pattern or target transmission torque.

Next, detailed description will be made of the learning control means 32.

As shown in FIG. 6, the learning control means 32 includes leaning determination means 322, and learning operation means 321. The learning determination means 322 is provided to capture the rotational speed of the output shaft 9 by determining the positions (a first speed state, a neutral state, a second speed state or the like) of the first and second claw clutches 16 and 19, and making determination as to the appropriateness of the response delay time of the assist clutch set by the claw clutch control means 31 by determining the releasing timings of the first and second claw clutches 16 and 19. The learning operation means 321 is provided to calculate the amount of correcting the response delay time of the assist clutch 25 according to the gear shifting pattern or the accelerator aperture, based on the results of determination made by the learning determination means 322.

The learning determination means 322 determines the appropriateness of the control timings of the first and second claw clutches 16 and 19 based on the state of the output shaft rotational speed described above with reference to FIG. 4. This will be described later in detail.

The learning operation means 321 calculates the amount of correcting the response delay time of the assist clutch based on the determination results of the learning determination means 322, i.e., the fast, slow or proper control timings of the first and second claw clutches 16 and 19, and the level thereof. For example, if the slow control timings of the first and second claw clutches are determined, the delay time of the assist clutch 25 is determined to be long, and the amount of correction for shortening the delay time is accordingly calculated. The learning operation means 321 takes out the response delay time of the assist clutch 25 corresponding to a current state (e.g., corresponding to a gear shifting pattern or an accelerator aperture) from the adjusting means 313 of the claw clutch control means 31, corrects the delay time by using the calculated amount of correction, and outputs the results to the adjusting means 313 again. As a result, the delay time of the assist clutch is corrected, and next delay time set for the assist clutch 25 by the adjusting means 313 takes a proper value. Therefore, the releasing control timings of the first and second claw clutches at the start of speed changing become accurate, making it possible to reduce a speed changing shock.

Next, description will be made of the example of the determination method of the learning determination means 322 by referring to FIG. 6.

Figure 7:
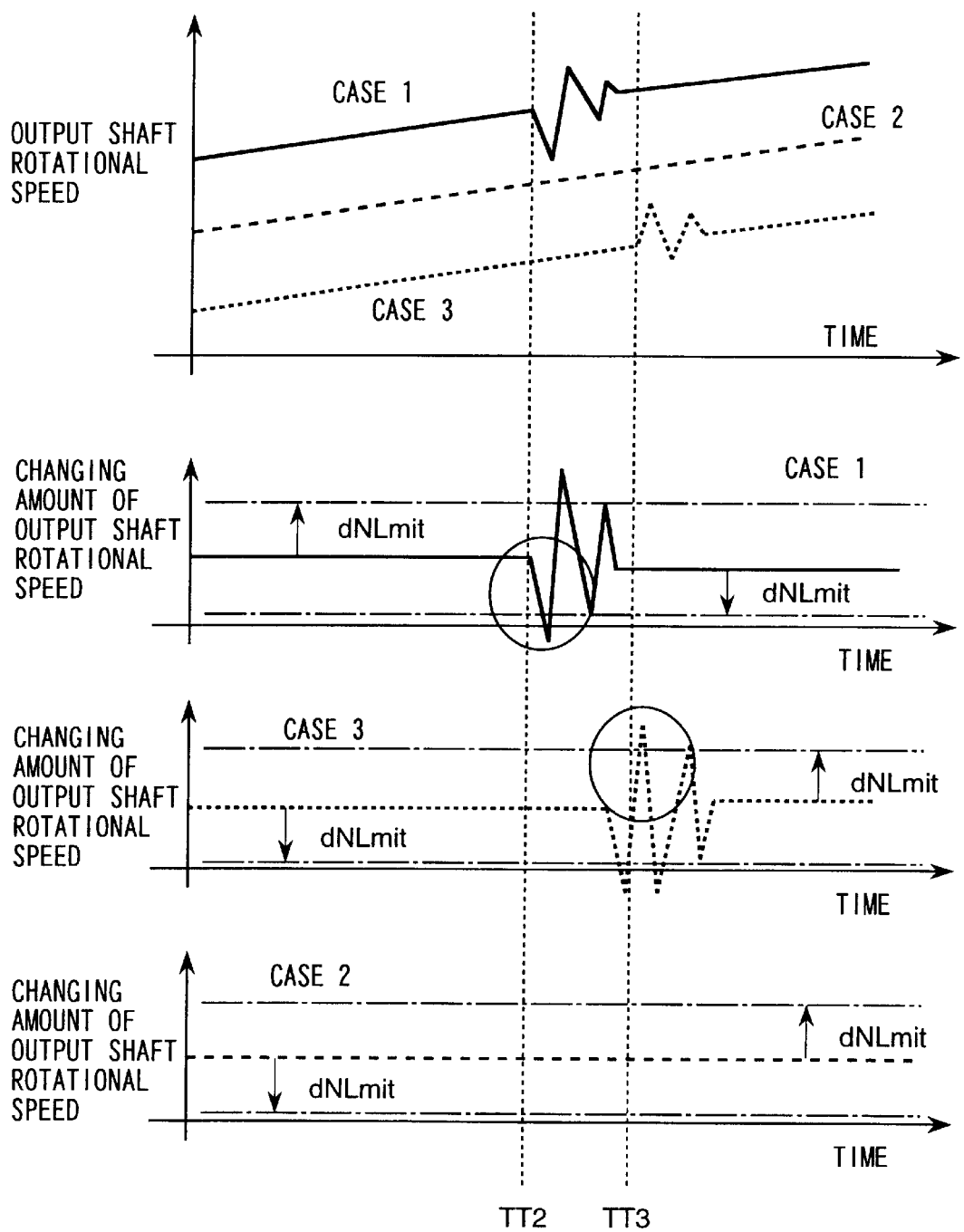
FIG. 7 is a time chart showing a rotational speed of the output shaft when determination is made by learning determination means shown in FIG. 6.

FIG. 7 shows the rotational speeds of the output shaft 9 in the three cases, i.e., the fast, slow and proper releasing timings of the first and second claw clutches 16 and 19 described above with reference to the uppermost part of FIG. 4, and also shows the changing amounts of the rotational speeds of the output shaft 9 in the respective three cases.

First, description will be made of a case where the releasing control timings of the first and second claw clutches 16 and 17 are proper. The case of proper releasing control timings corresponds to the case 2 of FIG. 7. In this case, no fluctuation occurs in the rotational speed of the output shaft as shown in the uppermost part of FIG. 7. Accordingly, to calculate a value of a rotational speed change, as in the case, third from above in FIG. 7, the changing amount of the output shaft rotational speed is not so large, and is set within a predetermined value (±dNLmit). Thus, calculation is made as to a change in the output shaft rotational speed for a specified time after the time (TT2) of releasing the first and second claw clutches (neutral state). If the calculated value is within a predetermined one, then the proper releasing timings can be determined. Now, the case of the fast releasing timings correspond to the case 1 shown in FIG. 7. Specifically, regarding the output shaft rotational speed, a vibration phenomenon occurs within a predetermined time after the time (TT2) when the first and second claw clutches 16 and 19 become neutral. Accordingly, to calculate a change in the output shaft rotational speed, as shown in the second part from above in FIG. 7, a change in the output shaft rotational speed within a specified time after the time (TT2) of setting the neutral state is great, exceeding the predetermined value (±dNLmit). When the releasing timing is especially fast, the change first exceeds the predetermined value of a minus side, and then may exceed the predetermined value of a plus side depending on occasion. Similarly, the case of the slow releasing timings correspond to the case 3 of FIG. 7. Specifically, regarding the rotational speed of the output shaft, a vibration phenomenon occurs within a specified time after the time (TT3) when the first and second claw clutches 16 and 19 become neutral. Accordingly, to calculate a change in the output shaft rotational speed, as shown in the lowest part of FIG. 7, a change in the output shaft rotational speed within a specified time after the time (TT3) when the neutral state is set is great, exceeding the predetermined value (±dNLmit). When the releasing timing is especially slow, the change first exceeds the predetermined value of a plus side, and then may exceed the predetermined value of a minus side depending on occasion. Thus, when the releasing control timings of the first and second claw clutches 16 and 19 are not proper, determination can be made based on the fact that the changing amount of the output shaft rotational speed exceeds the predetermined value (±dNLmit). The determination as to whether the releasing control timings are fast or slow can be made based on which of the directions, the minus or plus side, the rotational speed of the output shaft is changed first from the time of setting the first and second claw clutches 16 and 19 to be neutral. In this way, the changing amount of the output shaft rotational speed can be used to determine the releasing control timings of the first and second claw clutches 16 and 19. Further, depending on the side of the changing amount of the output shaft rotational speed, the degrees of deviation can be determined for the releasing control timings. For example, in the case of the fast releasing control timing, if the timing is very fast, a change is greater in the rotational speed of the output shaft.

Thus, the learning determination means 322 can capture the rotational speed of the output shaft and determine delay time.

Figure 8:
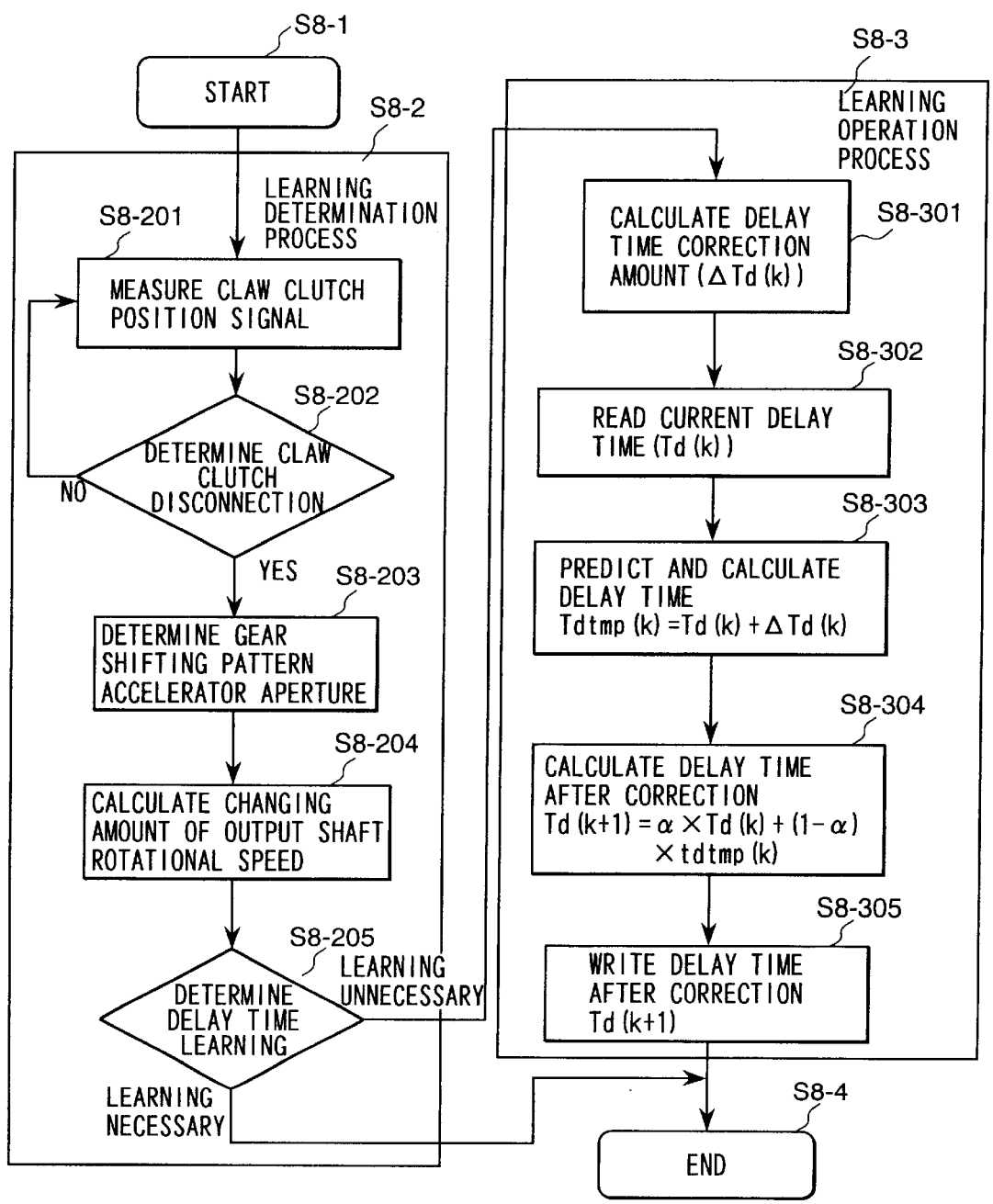
FIG. 8 is a flowchart showing a process carried out by the learning determination means and learning operation means shown in FIG. 6.

Next, description will be made of a process carried out by the learning control means 32 by referring to the flowchart of FIG. 8. The process of the learning control means 2 is divided into two parts, i.e., learning determination (S8-2) and learning operation (S8-3). The learning determination S8-2 is executed mainly by the learning determination means 322, while the learning operation S8-3 is executed mainly by the learning operation means 321.

The process of the learning control means 32 is started by determining the states of the first and second claw clutches 16 and 19. Here, the positions of the first and second claw clutches 16 and 9 are detected to determine whether the claw clutches have been released from the connected states or not (S8-201). If the change of the claw clutches from the connected states to neutral states is determined (S8-202), then the process moves to next step S8-203. In step S8-203, a current gear shifting pattern and an accelerator aperture are captured. As noted above, the response delay time of the assist clutch varies depending on the gear shifting pattern and the accelerator aperture. Thus, such capturing is carried out to enable determination to be made as to which delay time should be learned if a delay time table or the like is prepared depending on each state. Then, the changing amount, being measured, of the rotational speed of the output shaft is calculated (S8-204). Here, a changing amount from the point of time of setting the first and second claw clutches 16 and 19 to be neutral may be calculated. It is also possible to calculate a changing amount further back by a predetermined time from the point of neutral state setting time. Then, as described above with reference to FIG. 7, determination is made as to the execution of learning about the response delay time of the assist clutch 25 based on the changing amount of the output shaft rotational speed (S8-205). Specifically, if the changing amount of the output shaft rotational speed is within the predetermined value (±dNLmit), the learning process is finished without learning the response delay time (S8-4). If the learning process is necessary, then a next learning process S8-3 is carried out.

In the learning process S8-3, first, in S8-301, calculation is made as to a correction amount ΔTd for the response delay time of the assist clutch 25. The correction amount ΔTd of the response delay time is constant. Only its code (±) may be decided, or its size may be decided according to the maximum value of the changing amount of the output shaft rotational speed. Also, the changing amount of the output shaft rotational speed and the correction amount ΔTd of the response delay time may be provided in the form of a table or as a specified model. After the calculation of the correction amount ΔTd of the response delay time, the process moves to next step S8-302. In S8-302, current response delay time (Td) held by the adjusting means 313 of the claw clutch control means 31 is read. Subsequently, calculation is made as to a response delay time predicted value based on the correction amount ΔTd of the response delay time set in S8-301 and the current response delay time Td obtained in S8-302 (S8-303).

$$Tdtmp(k)=Td(k)+\Delta Td(k)$$

By using the response delay time predicted value Tdtmp calculated in S8-303 and the current response delay time obtained in S8-302, response delay time after correction is calculated in the following manner (S8-304):

$$Td(k+1)=\alpha \times Td(k)+(1-\alpha)\times Tdtmp(k) \quad 0 \leq \alpha \leq 1$$

The corrected response delay time Td(k+1) calculated in S8-304 is outputted to the adjusting means 313 of the claw clutch control means 31, and set as new delay time (S8-305).

With the foregoing process, the response delay time of the assist clutch 5 is carried out.

As described above, according to the invention, the releasing control timings of the first and second claw clutches 16 and 19 are corrected each time. Thus, even when a change with time or the like causes a change in the response characteristic of the assist clutch 25, proper releasing control timings can be maintained, making it possible to reduce a speed changing shock generated at the start of speed changing.

Next, another embodiment will be described by referring to FIG. 9.

Figure 9:
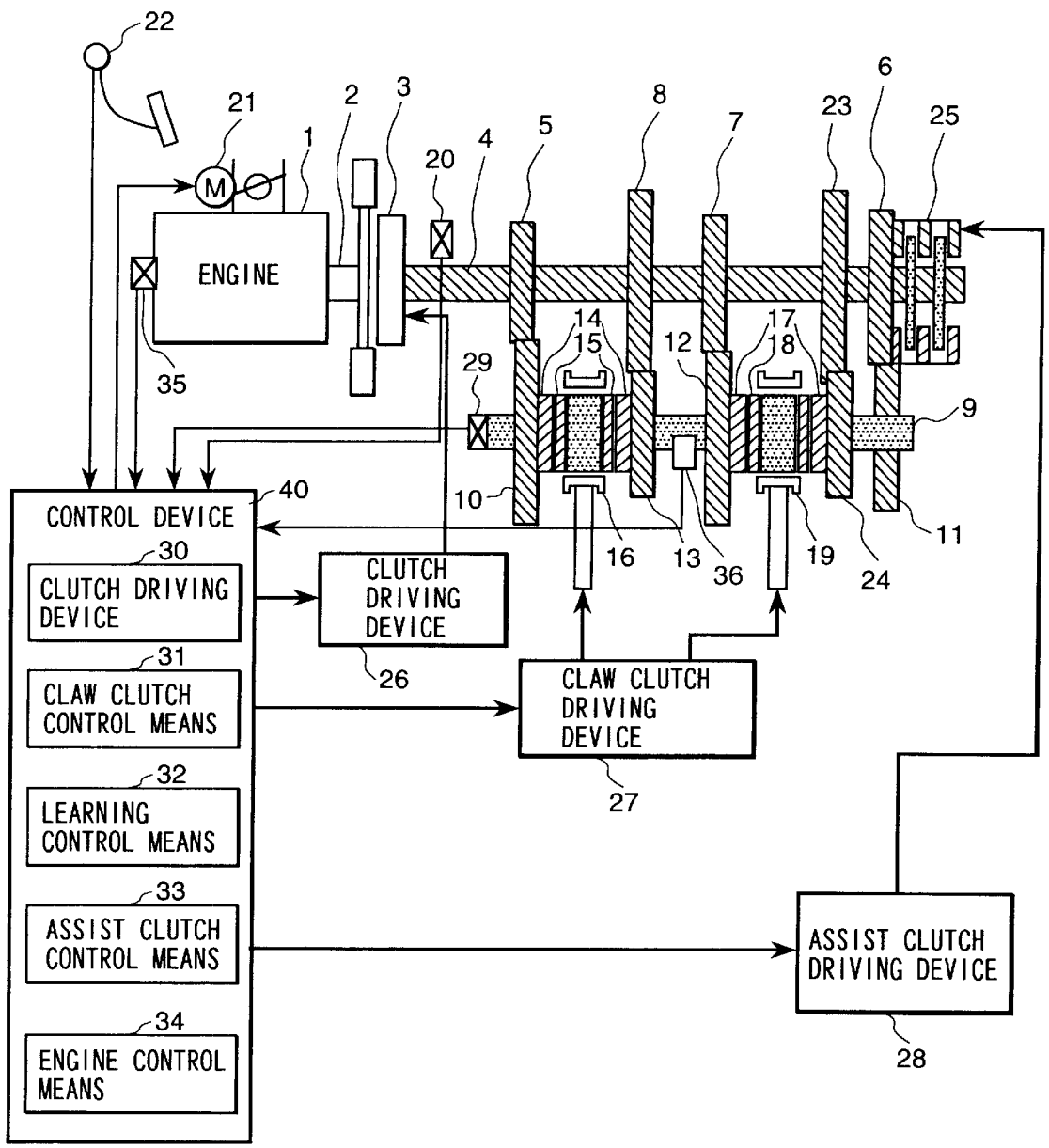
FIG. 9 is a constitutional view of an entire automatic transmission according to another embodiment of the invention.

FIG. 9 shows a case where torque detecting means 36 is provided for detecting the output shaft torque of the output shaft 9 in addition to the components of the embodiment shown in FIG. 1.

In FIG. 9, with regard to the learning of the assist clutch 25 carried out by the learning control means 32, instead of using the rotational speed of the output shaft, the output shaft detecting means 36 for directly detecting the torque of the output shaft 9 is used.

Figure 10:
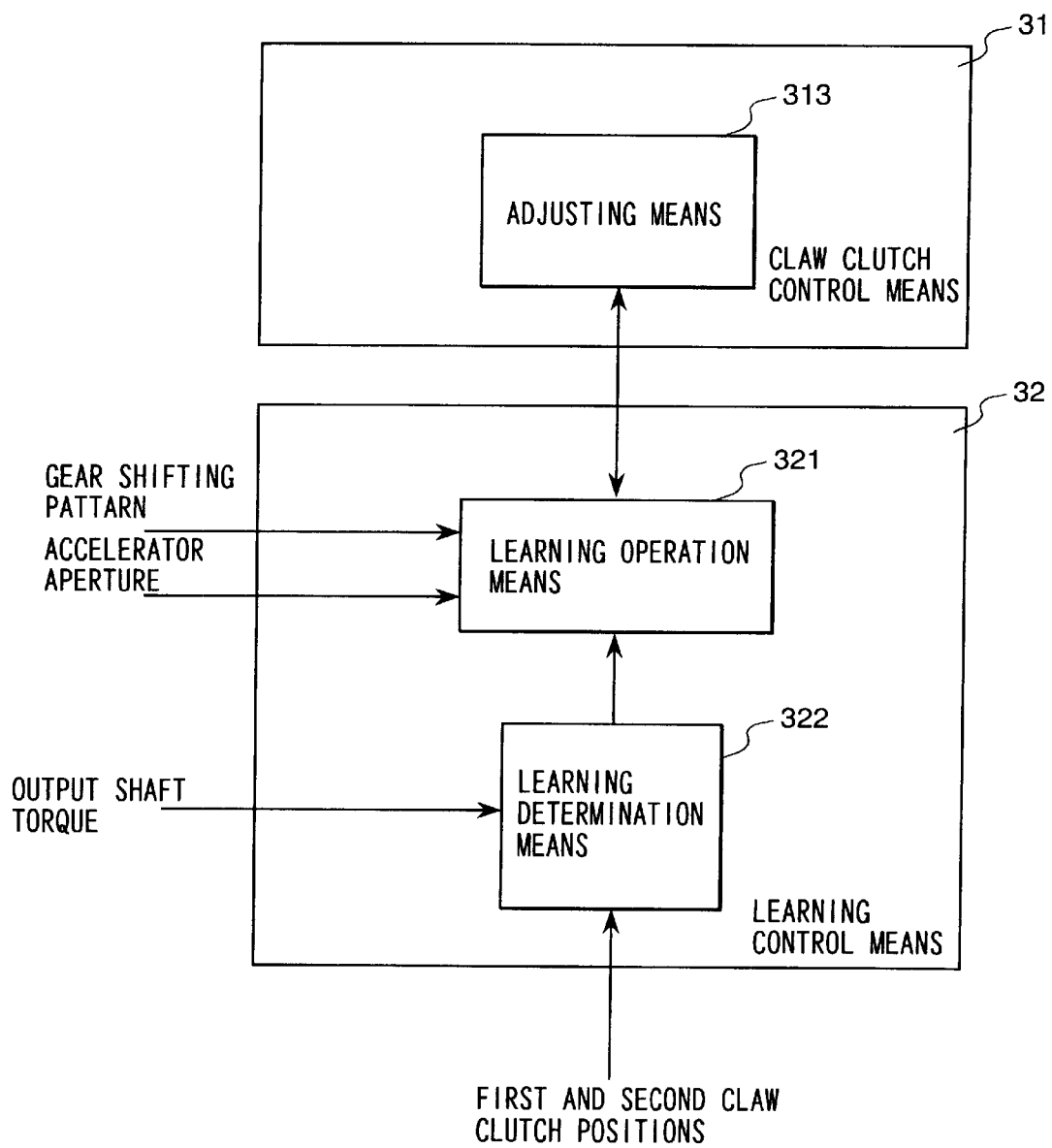
FIG. 10 is a constitutional view of learning control means shown in FIG. 9.
Figure 11:
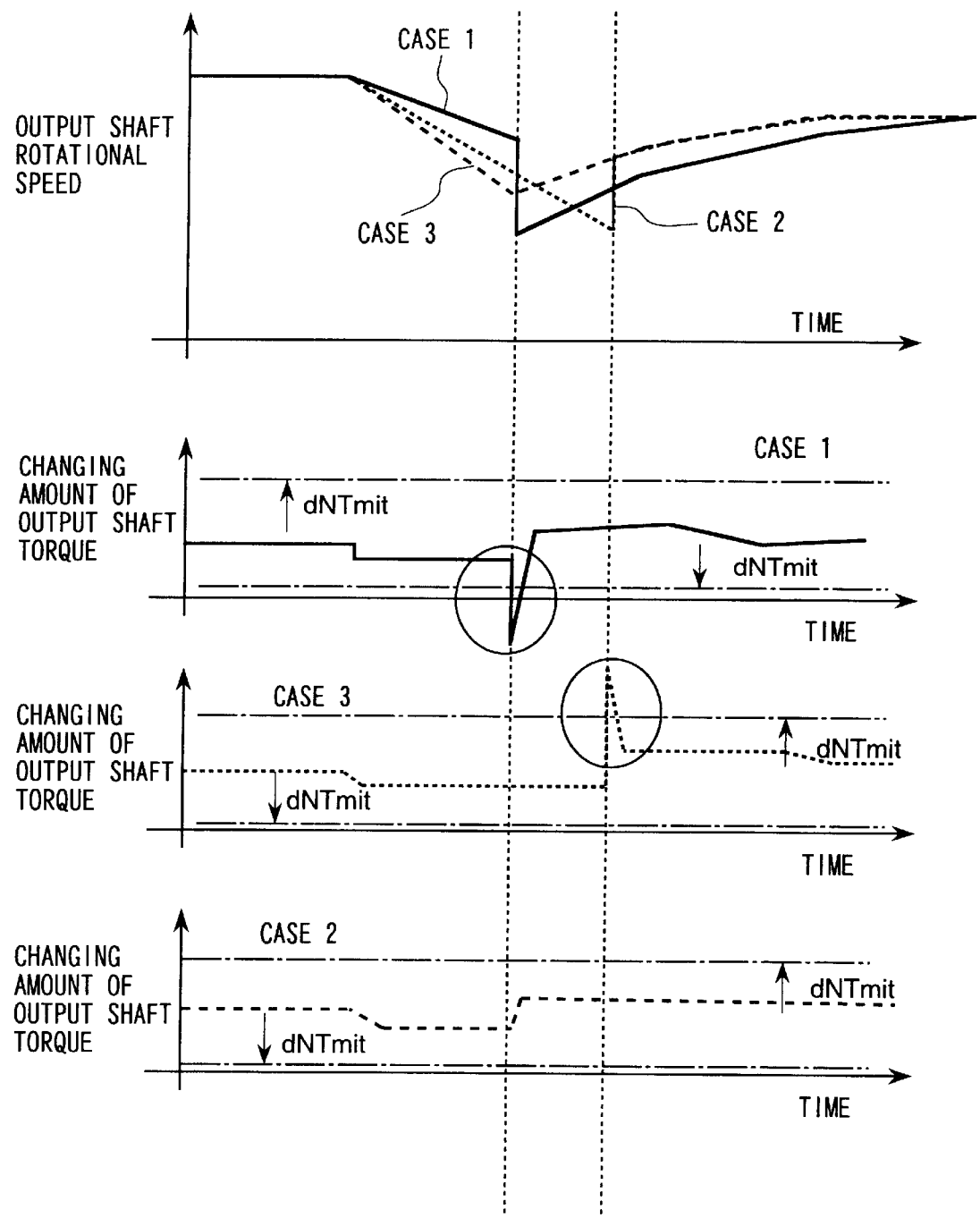
FIG. 11 is a time chart showing a torque of an output shaft when determination is made by learning determination means shown in FIG. 10.

FIG. 10 shows the constitution of the learning control means 32 of the embodiment of FIG. 9, and the process thereof is similar to that of the embodiment shown in FIG. 6. A difference is that the learning determination means 322 of the learning control means 32 uses output shaft torque. FIG. 11 shows the example of determination made by using the output shaft torque in this case.

FIG. 11 specifically shows output shaft torque in its uppermost part, and the changing amount of output shaft torque in the case of control timings and response delay time similar to those of FIG. 4. Specifically, the example shows a case where the releasing control timings of the first and second claw clutches 16 and 19 are proper (case 2 of FIG. 11), a case where releasing control timings are fast (case 1 of FIG. 11), and a case where releasing control timings are slow (case 3 of FIG. 11). As described above with reference to FIG. 4, if the releasing control timings are proper, a continuous and relatively smooth change occurs in output shaft torque as shown in the case 2 of FIG. 11. Consequently, the changing amount of the output shaft torque is so large as shown in the fourth part of FIG. 11, within a predetermined fluctuation range (±dTLimit). On the other hand, if the releasing control timings of the first and second claw clutches 16 and 19 are fast, when the claw clutches are released and set to be neutral as shown in the case 1 of FIG. 11, a torque level difference occurs in the output shaft torque. Consequently, as shown in the second part of FIG. 11, the changing amount of the output shaft torque exceeds the predetermined fluctuation range (±dTLimit). Conversely, if the releasing control timings are slow, when the claw clutches are released and set to be neutral as shown in the case 3 of FIG. 11, a torque level difference also occurs in the output shaft torque. Consequently, as shown in the third part of FIG. 11, the changing amount of the output shaft torque exceeds the predetermined fluctuation range (±dTLimit). Thus, the output shaft torque is detected, and then the releasing control timings can be determined based on the changing amount thereof. In this case, as shown in FIG. 11, if the releasing control timings are fast, the output shaft torque is greatly changed to a minus side first after the point of time of setting the first and second claw clutches 16 and 19 to be neutral. If the releasing control timings are slow, the output torque is greatly changed to a plus side first from the point of time of setting the first and second claw clutches 16 and 17 to be neutral. Accordingly, depending on which of the directions, the plus or minus side, the first change occurs in the output shaft torque after the point of time of setting the first and second claw clutches 16 and 19, it is possible to determine whether the releasing control timings are fast or slow.

Each of FIGS. 9 to 11 shows the example where the torque detecting means 36 is provided. Instead of the torque detecting means 36, an acceleration sensor can be installed to make determination by a similar method, and learning can be executed about the releasing control timings of the first and second claw clutches 16 and 19 in a manner similar to the foregoing.

As described above, according to another embodiment of the invention, since the releasing control timings of the first and second claw clutches are corrected each time, even when a change with time causes a change in the response characteristic of the assist clutch 25, proper release control timings can be maintained, making it possible to reduce a speed changing shock generated at the start of speed changing.

The invention is advantageous in that since a control timing is always learned/corrected properly irrespective of any changes with time, it is possible to reduce a speed changing shock generated during switching from the claw clutch to the assist clutch at the starting time of speed changing.

What is claimed is:

1. A control device for an automatic transmission having a friction clutch to which a torque from an engine is transmitted; drive gears, connected to the friction clutch, having their respective speed changing stages; driven gears corresponding to the drive gears, respectively; a claw clutch provided between the driven gears; and an assist clutch having gears for transmitting the torque during speed changing; the automatic transmission control device comprising;

learning determination means provided to determine a state of the claw clutch released during the speed changing; and learning operation unit to adjust the starting time of releasing the claw clutch based on the results of the determination made by the learning determination unit.

2. The automatic transmission control device according to claim 1, wherein the learning determination unit determines a state when the claw clutch is released by using at least one of a rotational speed of the output shaft, a torque of the output shaft and a vehicle acceleration.

3. A control device for an automatic transmission having a friction clutch to which a torque from an engine is transmitted; drive gears, connected to the friction clutch, having their respective speed changing stages; driven gears corresponding to the drive gears, respectively; a claw clutch provided between the driven gears; and an assist clutch having gears for transmitting the torque during speed changing; the automatic transmission being configured so that, after releasing of the claw clutch, a rotational speed of the output shaft is changed in a positive direction by at least a predetermined value and then changed in a negative direction during the speed changing, a timing for releasing the claw clutch at next speed changing is increased, and when a rotational speed of the same is changed in a negative direction by at least a determined value and then changed in a positive direction, a timing for releasing the claw clutch at next speed changing is slowed.

4. A control device for an automatic transmission having a friction clutch to which a torque from an engine is transmitted; drive gears, connected to the friction clutch, having their respective speed changing stages; driven gears corresponding to the drive gears, respectively; a claw clutch provided between the driven gears; and an assist clutch having gears for transmitting the torque during speed changing; the automatic transmission control device being configured such that, after releasing of the claw clutch, a torque of the output shaft is changed in an increasing direction by at least a predetermined value, a timing for releasing the claw clutch at next speed changing is increased, and when the torque of the same is changed in a reducing direction by at least a predetermined value, a timing for releasing the claw clutch is slowed.

5. A control method of an automatic transmission having a friction clutch to which a torque from an engine is transmitted; drive gears, connected to the friction clutch, having their respective speed changing stages; driven gears corresponding to the drive gears, respectively; a claw clutch provided between the driven gears; and an assist clutch having gears for transmitting the torque during speed changing; said method comprising:

determining a state of the claw clutch released during the speed changing; and adjusting a starting time of releasing the claw clutch based on the results of the determination.

6. The automatic transmission control method according to claim 5, wherein the state of the released claw clutch is determined based on at least one selected from a rotational speed of the output shaft, a torque of the output shaft and a vehicle acceleration.

7. A control method of an automatic transmission having a friction clutch to which a torque from an engine is transmitted; drive gears, connected to the friction clutch, having their respective speed changing stages; driven gears corresponding to the drive gears, respectively; a claw clutch provided between the driven gears; and an assist clutch having gears for transmitting the torque during speed changing; said method comprising at least one of:

increasing a timing for releasing the claw clutch at a next speed changing when, during the speed changing and after releasing of the claw clutch, a rotational speed of the output shaft is changed in a positive direction by at least a predetermined value, and then changed in a negative direction; and slowing a timing for releasing the claw clutch at a next speed changing when a rotational speed of the output shaft is changed in a negative direction by at least a predetermined value, and then changed in a positive direction.

8. A control method of an automatic transmission having a friction clutch to which a torque from an engine is transmitted; drive gears, connected to the friction clutch, having their respective speed changing stages; driven gears corresponding to the drive gears, respectively; a claw clutch provided between the driven gears; and an assist clutch having gears for transmitting the torque during speed changing; said method comprising at least one of:

increasing a timing for releasing the claw clutch at a next speed changing when, during the speed changing and after releasing of the claw clutch, a torque of the output shaft is changed in an increasing direction by at least a predetermined value; and slowing a timing for releasing the claw clutch at a next speed changing when a torque of the output shaft is changed in a reducing direction by at least a predetermined value.

9. A transmission system comprising an automatic transmission having a friction clutch to which a torque from an engine is transmitted; drive gears, connected to the friction clutch, having their respective speed changing stages; driven gears corresponding to the drive gears, respectively; a claw clutch provided between the driven gears; and an assist clutch having gears for transmitting the torque during speed changing; and a control device having learning determination unit to determine a state of the claw clutch released during the speed changing; and learning operation unit to adjust the starting time of releasing the claw clutch based on the results of the determination made by the learning determination unit.

* * * * *